(12) United States Patent
Jia et al.

(10) Patent No.: US 10,152,266 B1
(45) Date of Patent: Dec. 11, 2018

(54) SYSTEMS AND METHODS FOR PROVIDING DATA BACKUP SERVICES IN A VIRTUAL ENVIRONMENT

(71) Applicant: Veritas Technologies LLC, Mountain View, CA (US)

(72) Inventors: Yingsong Jia, Beijing (CN); Zhi Su, Beijing (CN); William Browning, Blaine, MN (US)

(73) Assignee: Veritas Technologies LLC, Mountain View, CA (US)

( * ) Notice: Subject to any disclaimer, the term of this patent is extended or adjusted under 35 U.S.C. 154(b) by 0 days.

(21) Appl. No.: 14/445,032

(22) Filed: Jul. 28, 2014

(51) Int. Cl.
*G06F 12/16* (2006.01)
*G06F 3/06* (2006.01)

(52) U.S. Cl.
CPC .............. *G06F 3/065* (2013.01); *G06F 3/061* (2013.01); *G06F 3/067* (2013.01); *G06F 3/0662* (2013.01)

(58) Field of Classification Search
None
See application file for complete search history.

(56) References Cited

U.S. PATENT DOCUMENTS

| | | | | |
|---|---|---|---|---|
| 8,209,290 B1* | 6/2012 | Dowers, II | ........ | G06F 17/30289 707/640 |
| 8,464,254 B1* | 6/2013 | Vohra | ................... | G06F 11/1458 718/1 |
| 8,819,374 B1* | 8/2014 | Don | ..................... | G06F 3/0647 711/112 |
| 9,509,797 B1* | 11/2016 | Pittman | ................... | H04L 67/32 |
| 2004/0233910 A1* | 11/2004 | Chen | ................... | H04L 67/1097 370/395.5 |
| 2010/0030983 A1* | 2/2010 | Gupta | ................. | G06F 11/1466 711/162 |
| 2010/0262794 A1* | 10/2010 | De Beer | ............ | G06F 9/45533 711/162 |
| 2011/0022812 A1* | 1/2011 | van der Linden | .... | G06F 9/5077 711/163 |
| 2012/0290729 A1* | 11/2012 | Hardy | ................... | G06F 3/0611 709/228 |

(Continued)

OTHER PUBLICATIONS

"Host adapter", http://en.wikipedia.org/wiki/Host_adapter, as accessed May 28, 2014, Wikipedia, (Jan. 27, 2005).

(Continued)

*Primary Examiner* — Adam M Queler
*Assistant Examiner* — Trang K Ta
(74) *Attorney, Agent, or Firm* — FisherBroyles LLP

(57) ABSTRACT

The disclosed computer-implemented method for providing data backup services in a virtual environment may include (1) identifying a data path used to transfer, via a storage area network, backup data between a client system and a host operating system of a backup server, (2) establishing communication between the host operating system and a backup agent on a guest operating system of the backup server, and (3) extending the data path to the guest operating system by facilitating data transfer between the host operating system and the backup agent of the guest operating system such that the backup data is transferred between the client system and the backup agent of the guest operating system. Various other methods, systems, and computer-readable media are also disclosed.

20 Claims, 7 Drawing Sheets

(56) References Cited

U.S. PATENT DOCUMENTS

2013/0246725 A1* 9/2013 Kawamoto ............. G06F 3/065
711/162

OTHER PUBLICATIONS

"Daemon (computing)", http://en.wikipedia.org/wiki/Daemon_(computing), as accessed May 28, 2014, Wikipedia, (May 19, 2011).
"Virtual machine", http://en.wikipedia.org/wiki/Virtual machine, as accessed May 28, 2014, Wikipedia, (Jan. 4, 2004).
Hirschfeld, Rob, "Virtualizing Approaches for OpenStack Nova: looking at the many ways to skin the CAcTus (KVM v XenServer v ESX)", http://en.community.dell.com/techcenter/b/techcenter/archive/2011/06/01/virtualizing-approaches-for-openstack-nova-looking-at-the-many-ways-to-skin-the-cactus-kvm-v-xenserver-v-esx, as accessed May 28, 2014, Dell TechCenter, (Jun. 1, 2011).
"Shared memory", http://en.wikipedia.org/wiki/Shared_memory, as accessed May 28, 2014, Wikipedia, (Aug. 19, 2004).
"Symantec NetBackup™ SAN Client and Fibre Transport Guide—UNIX, Windows, Linux—Release 7.5", http://www-personal.umich.edu/~danno/symantec/NetBackup_SANClient Guide.pdf, as accessed May 28, 2014, Symantec Corporation, (2012).
"VMware", http://www.vmware.com/, as accessed May 28, 2014, (Jan. 25, 1999).

\* cited by examiner

SYSTEMS AND METHODS FOR PROVIDING DATA BACKUP SERVICES IN A VIRTUAL ENVIRONMENT

BACKGROUND

Virtualization of computing processes enables the creation of customizable virtual execution environments that replicate physical computing environments. Virtualization may be used to simulate a wide range of computing system components, including computer hardware, operating systems, and networks. As such, virtualization may offer a number of advantages and be applied for a variety of purposes.

Specifically, data backup and retrieval technologies may benefit from virtualization. For example, storing data via virtual machines may reduce both the time required to retrieve the data and the computing resources needed to store the data. Unfortunately, some traditional systems for providing data backup services over a network may be incompatible with virtualization technologies. For example, conventional backup services may transmit data between a client system and a backup server over a storage area network, and backup agents that facilitate data storage and retrieval within the virtual environment on the backup server may be unable to communicate with portions of the backup server that execute outside the virtual environment. As a result, data may be unable to pass from the client system to the virtual environment. Therefore, the present disclosure identifies and addresses and need for additional and improved systems and methods for providing data backup services in virtual environments.

SUMMARY

As will be described in greater detail below, the instant disclosure describes various systems and methods for providing data backup services in a virtual environment by creating a bridge between a host operating system that receives backup data and a guest operating system that stores the backup data in a virtual environment. Once established, the bridge may allow data transfer between the guest operating system and a client connected to the host operating system.

In one example, a computer-implemented method for performing such a task may include (1) identifying a data path used to transfer, via a storage area network, backup data between a client system and a host operating system of a backup server, (2) establishing communication between the host operating system and a backup agent on a guest operating system of the backup server, and (3) extending the data path to the guest operating system by facilitating data transfer between the host operating system and the backup agent of the guest operating system such that the backup data is transferred between the client system and the backup agent of the guest operating system. In some embodiments, identifying the data path used to transfer backup data between the client system and the host operating system may include creating the data path.

In some examples, establishing communication between the host operating system and the backup agent may include establishing communication between a daemon running on the host operating system and the backup agent. In these examples, the daemon running on the host operating system may control a driver that facilitates receiving and sending the backup data via at least one target port on the backup server. Furthermore, the driver may execute outside of the host operating system.

In some embodiments, facilitating data transfer between the host operating system and the backup agent may include implementing a protocol based on a cloud computing platform and/or shared memory. In addition, in some examples, the guest operating system may store the backup data on at least one virtual appliance configured as a special purpose virtual machine.

In some examples, the storage area network may transfer, via fibre channels, the backup data between at least one initiator port on the client system and at least one target port on the backup server. In these examples, extending the data path may include allocating the initiator port and the target port based on storage locations of the backup data within the guest operating system.

In one embodiment, a system for implementing the above-described method may include (1) an identification module that identifies a data path used to transfer, via a storage area network, backup data between a client system and a host operating system of a backup server, (2) an establishing module that establishes communication between the host operating system and a backup agent on a guest operating system of the backup server, and (3) an extending module that extends the data path to the guest operating system by facilitating data transfer between the host operating system and the backup agent of the guest operating system such that the backup data is transferred between the client system and the backup agent of the guest operating system. In addition, the system may include at least one processor that executes the identification module, the establishing module, and the extending module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a data path used to transfer, via a storage area network, backup data between a client system and a host operating system of a backup server, (2) establish communication between the host operating system and a backup agent on a guest operating system of the backup server, and (3) extend the data path to the guest operating system by facilitating data transfer between the host operating system and the backup agent of the guest operating system such that the backup data is transferred between the client system and the backup agent of the guest operating system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
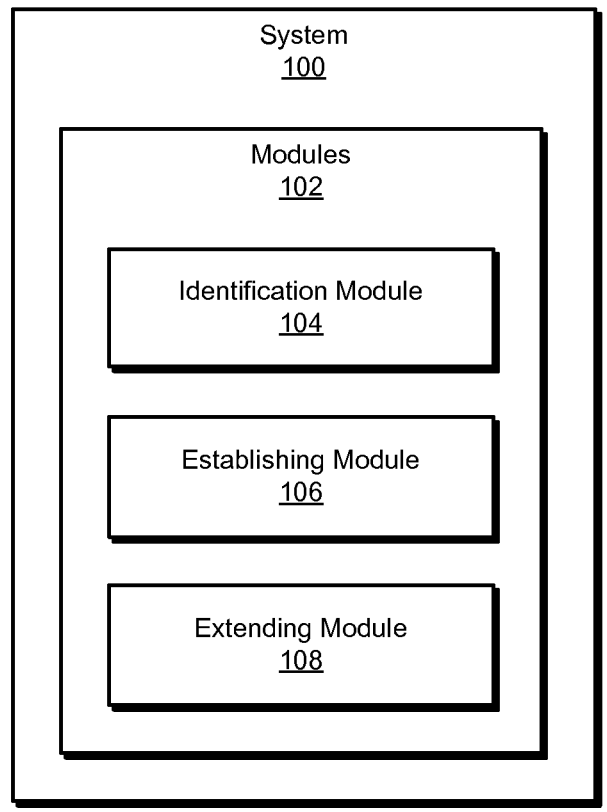
FIG. 1 is a block diagram of an exemplary system for providing data backup services in a virtual environment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for providing data backup services in a virtual environment. As will be explained in greater detail below, by establishing communication between a host operating system and a guest operating system of a backup server, the systems and methods described herein may facilitate data transfer between the host and guest operating systems. As such, the disclosed systems and methods may enable backup and recovery services in a virtual environment, thereby decreasing the time and computing resources involved in storing and retrieving backup data.

Figure 2:
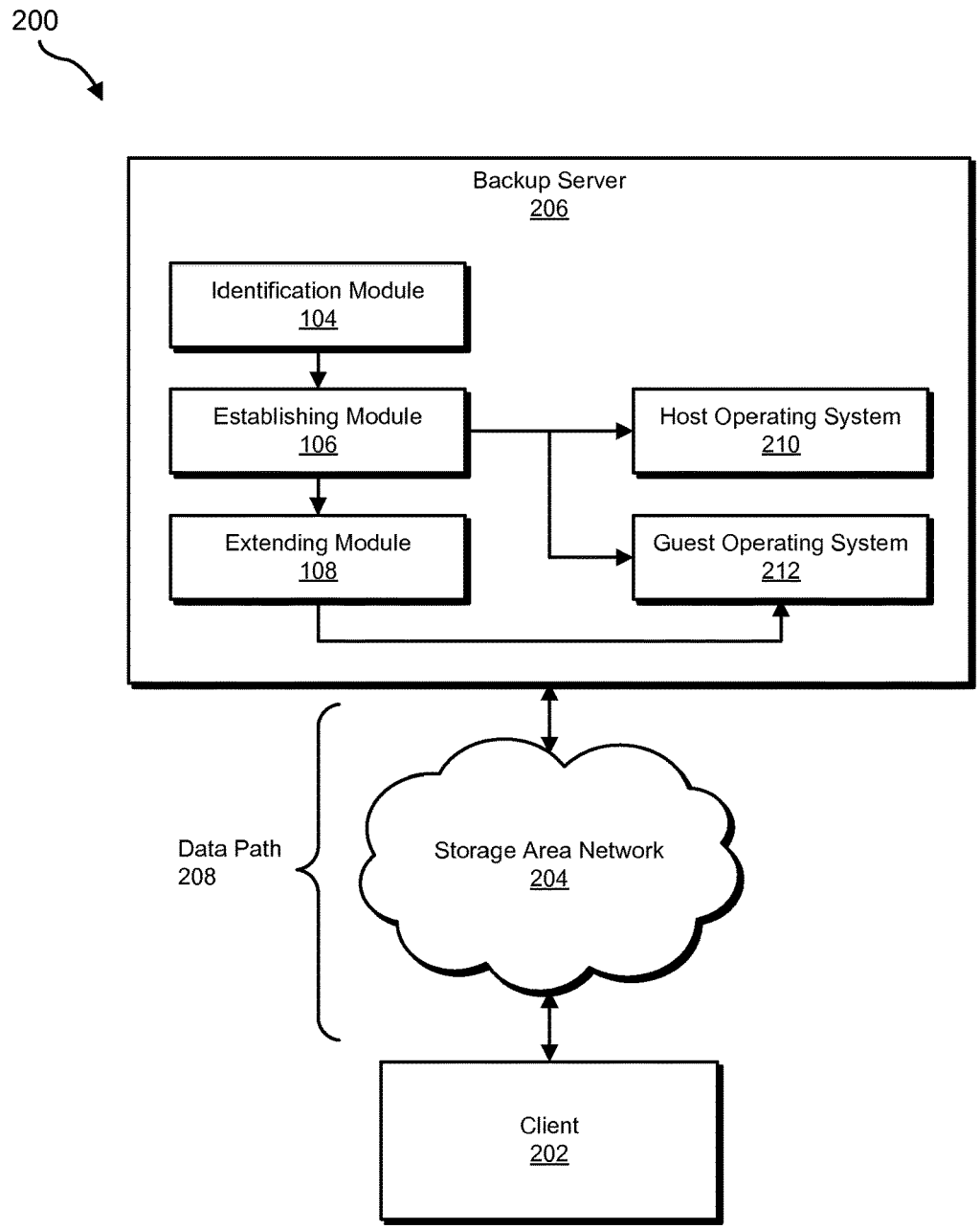
FIG. 2 is a block diagram of an additional exemplary system for providing data backup services in a virtual environment.

The following will provide, with reference to FIGS. 1 and 2, detailed descriptions of exemplary systems for providing data backup services in a virtual environment. Detailed descriptions of corresponding computer-implemented methods will also be provided in connection with FIG. 3. In addition, detailed descriptions of data paths between client systems and host operating systems of backup servers will be provided in connection with FIG. 4. Furthermore, detailed descriptions of extended data paths between client systems and guest operating systems of backup servers will be provided in connection with FIG. 5. Finally, detailed descriptions of an exemplary computing system and network architecture capable of implementing one or more of the embodiments described herein will be provided in connection with FIGS. 6 and 7, respectively.

FIG. 1 is a block diagram of an exemplary system 100 for providing data backup services in a virtual environment. As illustrated in this figure, exemplary system 100 may include one or more modules 102 for performing one or more tasks. For example, and as will be explained in greater detail below, exemplary system 100 may include an identification module 104 that identifies a data path used to transfer, via a storage area network, backup data between a client system and a host operating system of a backup server. Exemplary system 100 may also include an establishing module 106 that establishes communication between the host operating system and a backup agent on a guest operating system of the backup server.

In addition, and as will be described in greater detail below, exemplary system 100 may include an extending module 108 that extends the data path to the guest operating system by facilitating data transfer between the host operating system and the backup agent of the guest operating system such that the backup data is transferred between the client system and the backup agent of the guest operating system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., client 202 and/or backup server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a client 202 in communication with a backup server 206 via a storage area network 204. In one example, client 202 may be programmed with one or more of modules 102 in order to facilitate transmitting backup data to and receiving backup data from backup server 206. Additionally or alternatively, backup server 206 may be programmed with one or more of modules 102 in order to facilitate transmitting backup data to and receiving backup data from client 202. Furthermore, one or more of modules 102 may hosted within or as part of a bridge that enables communication between host operating system 210 and guest operating system 212 in FIG. 2.

In one embodiment, one or more of modules 102 from FIG. 1 may, when executed by at least one processor of client 202 and/or backup server 206, enable client 202 and/or backup server 206 to provide data backup services in a virtual environment. For example, and as will be described in greater detail below, identification module 104 may cause client 202 and/or backup server 206 to identify a data path (e.g., data path 208) used to transfer, via a storage area network (e.g., storage area network 204), backup data between a client system (e.g., client 202) and a host operating system (e.g., host operating system 210) of a backup server (e.g., backup server 206). In addition, establishing module 106 may cause client 202 and/or backup server 206 to establish communication between the host operating system and a backup agent on a guest operating system (e.g., guest operating system 212) of the backup server. Finally, extending module 108 may cause client 202 and/or backup server 206 to extend the data path to the guest operating system by facilitating data transfer between the host operating system and the backup agent of the guest operating system such that the backup data is transferred between the client system and the backup agent of the guest operating system.

Client 202 generally represents any type or form of computing device capable of facilitating data transfer to a backup server. Client 202 may represent any of a variety of types of database servers and/or application hosts. In some examples, client 202 may represent a special-purpose client configured to transmit backup data efficiently via a SAN (e.g., client 202 may represent a SAN client as described by the NETBACKUP recovery system).

Backup server 206 generally represents any type or form of computing device that is capable receiving, storing, and retrieving data in a virtual environment. In some examples, backup server 206 may represent any of a variety of types of servers configured to receive data via fibre channels. In other examples, backup server 206 may represent a special-purpose media server configured to process backup data via a driver (e.g., a target mode driver, as described by the NETBACKUP recovery system).

Storage area network 204 generally represents any medium or architecture capable of facilitating communication or data transfer from a storage device (e.g., backup server 206) to a client (e.g., client 202). In some examples, storage area network 204 may rapidly transfer data from a storage device to a client such that the storage device appears directly attached to the client. Furthermore, storage area network 204 may transfer data via fibre channels. Specifically, in some embodiments, storage area network 204 may transfer data via the NETBACKUP FIBRE TRANSPORT mechanism and/or any other suitable fibre transport system.

Figure 3:
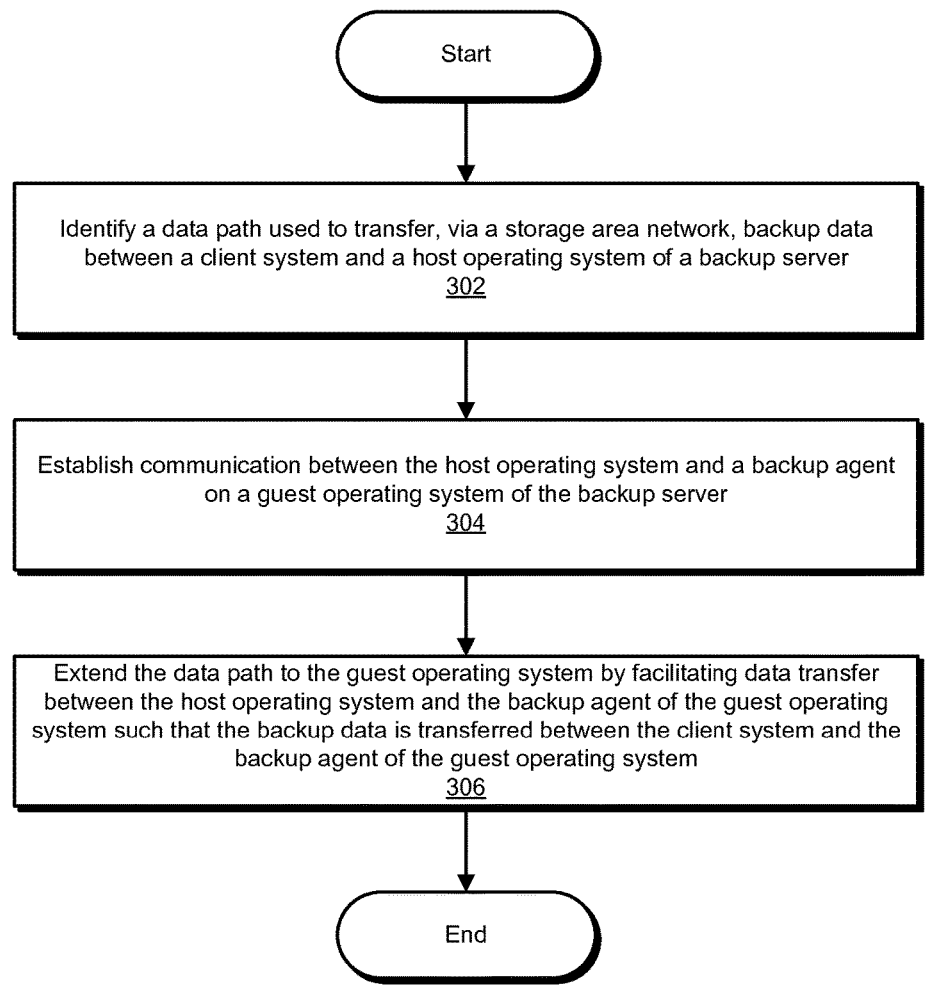
FIG. 3 is a flow diagram of an exemplary method for providing data backup services in a virtual environment.

FIG. 3 is a flow diagram of an exemplary computer-implemented method 300 for providing data backup services in a virtual environment. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a data path used to transfer, via a storage area network, backup data between a client system and a host operating system of a backup server. For example, identification module 104 may, as part of backup server 206 in FIG. 2, identify data path 208 used to transfer, via storage area network 204, backup data between client 202 and host operating system 210.

The term "host operating system," as used herein, generally refers to any type or form of primary operating system installed on a computing device. In some examples, a computing device may run one (and only one) host operating system. In addition, a host operating system may control one or more other operating systems running on the same device. In contrast, the term "guest operating system," as used herein, generally refers to any type or form of secondary operating system that is controlled by a host operating system. In some examples, a computing device may run multiple guest operating systems. In addition, a guest operating system may represent a virtual operating system (e.g., a virtual machine). From the perspective of a guest operating system, the guest operating system may function as an independent operating system (i.e., the host operating system controlling the guest operating system, as well as additional guest operating systems running on the same physical device, may be transparent to the guest operating system).

Furthermore, the term "backup data," as used herein, generally refers to any type or form of information, file, portion of code, or other data that a user or application has selected to store (e.g., via a storage area network) in a location where it may later be retrieved. In some examples, backup data may represent important files or documents that a user wishes to save in a secure location. Additionally or alternatively, backup data may represent excess data that cannot be stored on another computing device due to storage limitations.

The systems described herein may identify the data path used to transfer backup data between the client system and the backup server in a variety of ways. In some examples, identification module 104 may identify data path 208 as an existing data path (e.g., a data path already implemented between a SAN client and a media server as part of a NETBACKUP recovery system). Identification module 104 may also identify any additional type of pre-configured data path. In other examples, identification module 104 may identify data path 208 by creating all or a portion of data path 208.

Figure 4:
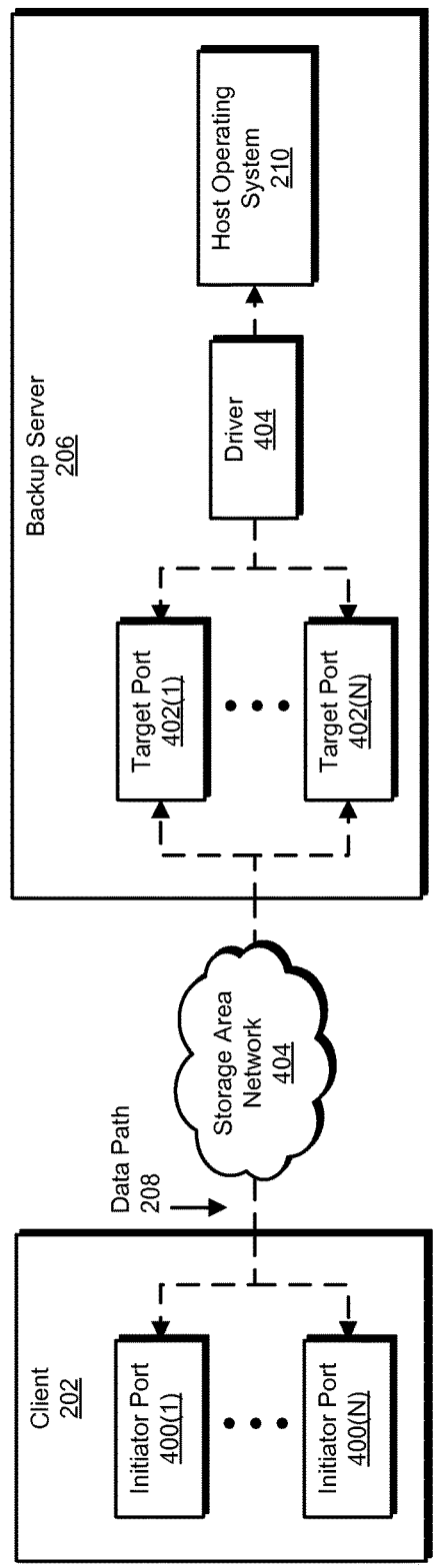
FIG. 4 is an illustration of an exemplary data path between a client system and a host operating system of backup server.

In some embodiments, identification module 104 may identify data path 208 by identifying, creating, and/or configuring the components of data path 208. As an example, FIG. 4 illustrates data path 208 between client 202 and backup server 206. In this example, identification module 104 may identify client 202, host operating system 210 on backup server 206, and storage area network 204. In addition, identification module 104 may identify and/or install a driver 404 (as well as any additional drivers) on backup server 206 that facilitates receiving and sending the backup data through ports on client 202 and backup server 206. In some examples, driver 404 may be controlled by host operating system 210. In addition, driver 404 may execute inside of and/or as part of host operating system 210. Alternatively, driver 404 may execute outside of host operating system 210 (e.g., in a guest operating system, in a virtual machine, on bare metal, etc.).

As further illustrated in FIG. 4, client 202 may include initiator ports 400(1)-(N) and backup server 206 may include target ports 402(1)-(N). In one embodiment, target ports 400(1)-(N) may receive fibre channels at host bus adapter (HBA) ports on interface cards. In this embodiment, driver 404 may represent a driver (e.g., a target mode driver, as described by the NETBACKUP recovery system) that configures the ports to receive instructions (e.g., switches the ports to "target mode"). Furthermore, in some examples, identification module 104 may identify and/or configure initiator ports 400(1)-(N) on client 202 that forward instructions for storing and retrieving data to target ports 402(1)-(N).

As illustrated by the dashed lines in FIG. 4, data path 208 may extend from initiator ports 400(1)-(N), across storage area network 204, through target ports 402(1)-(N), through driver 404, and culminate at host operating system 210, where the backup data may be stored. Identification module 104 may identify data path 208 as any combination of initiator ports 400(1)-(N), target ports 402(1)-(N), and/or fibre channels within storage area network 204.

Returning to FIG. 3, at step 304 one or more of the systems described herein may establish communication between the host operating system and a backup agent on a guest operating system of the backup server. For example, establishing module 106 may, as part of backup server 206 in FIG. 2, establish communication between host operating system 210 and the backup agent on guest operating system 212 of backup server 206.

Figure 5:
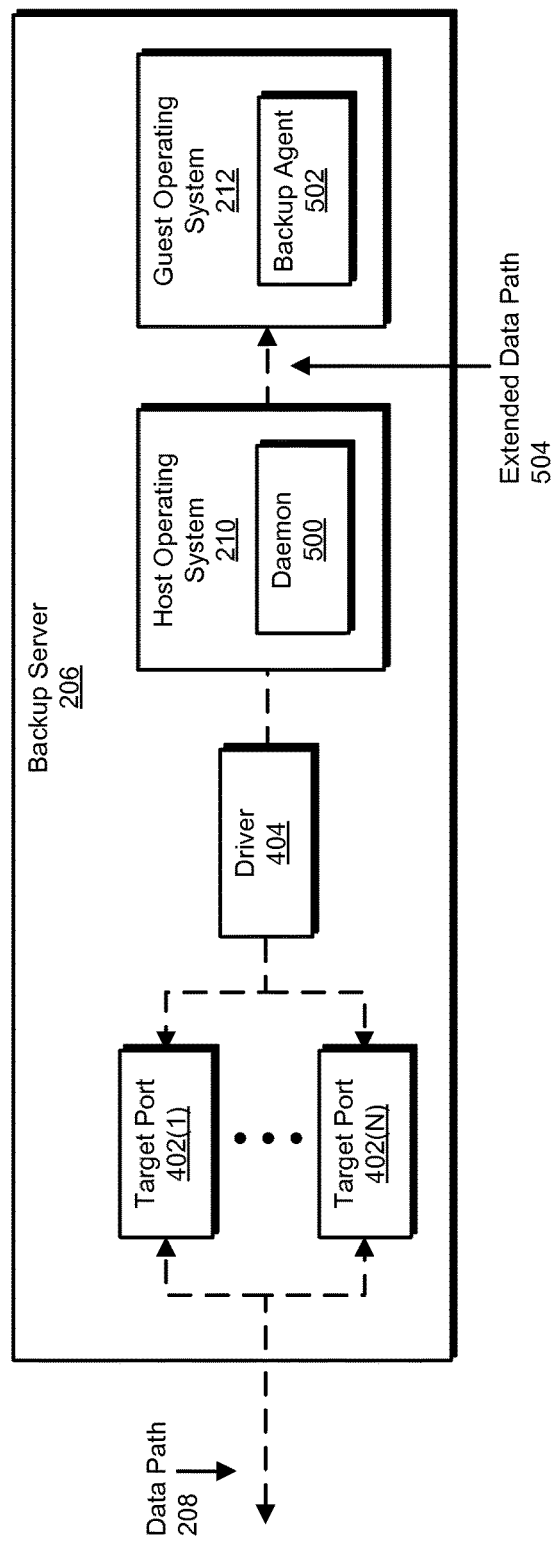
FIG. 5 is an illustration of an exemplary extended data path between a client system and a backup agent on a guest operating system of a backup server.

As an example, FIG. 5 illustrates a bridge between host operating system 210 and guest operating system 212. As shown in FIG. 5, host operating system 210 may execute a daemon 500 (e.g., that controls driver 404). In addition, establishing module 106 may facilitate communication between daemon 500 and a backup agent 502 via an extended data path 504.

The systems described herein may establish communication between the host operating system and the backup agent in a variety of ways. Referring to the example of FIG. 5, establishing module 106 may first install and/or create backup agent 502 and/or guest operating system 212 on backup server 206. For example, establishing module 106 may partition a portion of the computing resources on backup server 206 to execute guest operating system 212. As previously explained, guest operating system 212 may represent a virtual operating system. Establishing module 106 may then install backup agent 502 within guest operating system 212. In some examples, backup agent 502 may be responsible for storing and retrieving the backup data within the virtual environment of guest operating system 212. In some examples, backup agent 502 may represent a general-purpose backup agent that facilitates virtual data storage and retrieval. In other examples, backup agent 502 may represent a pre-configured and/or specialized backup agent (e.g., a portion of a NETBACKUP recovery system).

Backup agent 502 may store the backup data in a variety of ways. For example, backup agent 502 may store the backup data on one or more virtual machines or virtual appliances controlled by guest operating system 212. The term "virtual machine," as used herein, generally refers to any type or form of software-based emulation or simulation of a computing device. For example, a virtual machine may replicate all or a portion of the hardware and/or software implemented on a computing device. In addition, the term "virtual appliance," as used herein, generally refers to any type or form of specialized or customized virtual machine. For example, a virtual appliance may represent a virtual environment configured to perform a specific set of tasks (e.g., backup and recovery tasks). A virtual appliance may have a limited operating system (e.g., just enough operating system) that is configured to handle the specialized functions of the virtual appliance. In some examples, backup agent 502 may efficiently process the backup data by storing the backup data on specially-configured virtual appliances within guest operating system 212.

In some embodiments, establishing module 106 may establish communication between host operating system 210 and backup agent 502 by establishing communication between daemon 500 running on host operating system 210 and backup agent 502. The term "daemon," as used herein, generally refers to any type or form of application, executable code, or computer program that runs as a background process (i.e., as opposed to a foreground process). For example, a daemon may execute without requesting or requiring instruction from a user. Establishing module 106 may create and/or install daemon 500 within host operating system 210. In some examples, daemon 500 may control driver 404, which facilitates sending and receiving data via target ports on backup server 206 (along with any additional directed tasks). As previously mentioned, driver 404 may execute outside of host operating system 210.

In some examples, establishing module 106 may establish communication between host operating system 210 and backup agent 502 in order to enable driver 404 to facilitate sending and receiving the backup data. For example, driver 404 may rely on knowledge of the physical ports and/or storage locations of backup server 206 in order to distribute data to and store data received from ports on client 202.

Driver 404 may be unable to directly access this information when the backup data and backup agent 502 reside on guest operating system 212. Therefore, establishing module 106 may create a bridge between daemon 500 on host operating system 210 and backup agent 502 such that daemon 500 may forward data and/or instructions from backup agent 502 to driver 404, as well as forward data and/or instructions from driver 404 to backup agent 502.

The systems described herein may create the bridge between the daemon and the backup agent in a variety of ways. In some examples, establishing module 106 may facilitate data transfer between daemon 500 and backup agent 502 by implementing a protocol based on a cloud computing platform. Specifically, establishing module 106 may implement a protocol based on an infrastructure as a service solution (e.g., OPENSTACK). For example, establishing module 106 may deploy a hypervisor (e.g., a kernel-based virtual machine) on host operating system 210 that manages virtual machines or virtual appliances in guest operating system 212. The hypervisor may facilitate communication between host operating system 210 and guest operating system 212.

In addition, establishing module 106 may implement a protocol using shared memory. For example, establishing module 106 may store the backup data in a block of random access memory (RAM) such that separate processors running host operating system 210 and the backup agent have access to the backup data. In general, establishing module 106 may implement any type or form of protocol across host operating system 210 and guest operating system 212 that allows information to be passed from the backup agent on guest operating system 212 to the driver (i.e., via daemon 500).

Returning to FIG. 3, at step 306 one or more of the systems described herein may extend the data path to the guest operating system by facilitating data transfer between the host operating system and the backup agent of the guest operating system such that the backup data is transferred between the client system and the backup agent of the guest operating system. For example, extending module 108 may, as part of backup server 206, extend data path 208 to guest operating system 212 by facilitating data transfer between host operating system 210 and the backup agent of guest operating system 212.

The systems described herein may extend the data path in a variety of ways. In some examples, extending module 108 may extend data path 208 by connecting and/or configuring each component of data path 208. For example, establishing communication between host operating system 210 and the backup agent on guest operating system 212 may not be sufficient to enable data transfer between client 202 and guest operating system 212. Specifically, initiator ports 400(1)-(N) and target ports 402(1)-(N) may not be configured to transfer backup data to and from guest operating system 212. In one embodiment, driver 404 may have previously allocated initiator ports 400(1)-(N) and target ports 402(1)-(N) based on storage locations within host operating system 210. In another embodiment, if a recovery system was not previously implemented on client 202 and backup server 206, driver 404 may not have allocated any ports for data transfer. As such, extending module 108 may extend data path 208 by allocating (or directing daemon 500 to allocate) one or more of initiator ports 400(1)-(N) and/or one or more of target ports 402(1)-(N) based on storage locations of the backup data within guest operating system 212.

Once extending module 108 has allocated target and initiator ports on client 202 and backup server 206, the systems described herein may efficiently transfer the backup data between client 202 and the backup agent. For example, upon request from a user and/or client 202, extending module 108 may store the backup data in guest operating system 212 by forwarding the backup data from initiator ports 400(1)-(N) to target ports 402(1)-(N), and then directing the backup data from host operating system 210 to guest operating system 212, where the backup agent allocates storage space for the backup data within guest operating system 212. In addition, upon request from a user and/or client 202, extending module 108 may retrieve the backup data from within guest operating system 212 and forward the backup data along data path 208 to client 202.

The systems and methods described herein may be implemented in a variety of ways and provide a number of advantages. As was explained above, by establishing communication between a host operating system and a guest operating system of a backup server, the systems and methods described herein may facilitate data transfer between the host and guest operating systems. As such, the disclosed systems and methods may enable backup and recovery services in a virtual environment, therefore decreasing the time and computing resources required to store and retrieve backup data.

Figure 6:
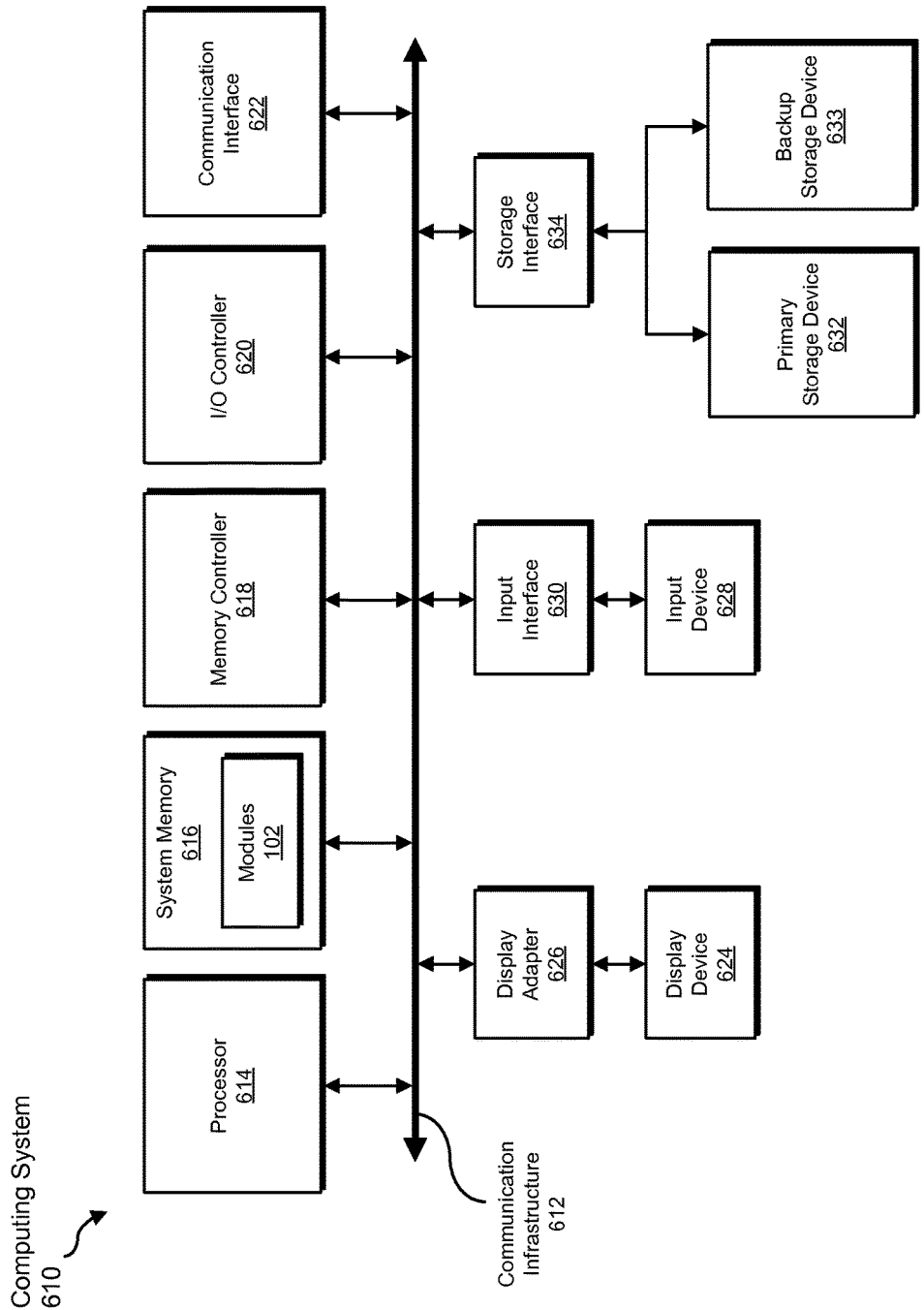
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
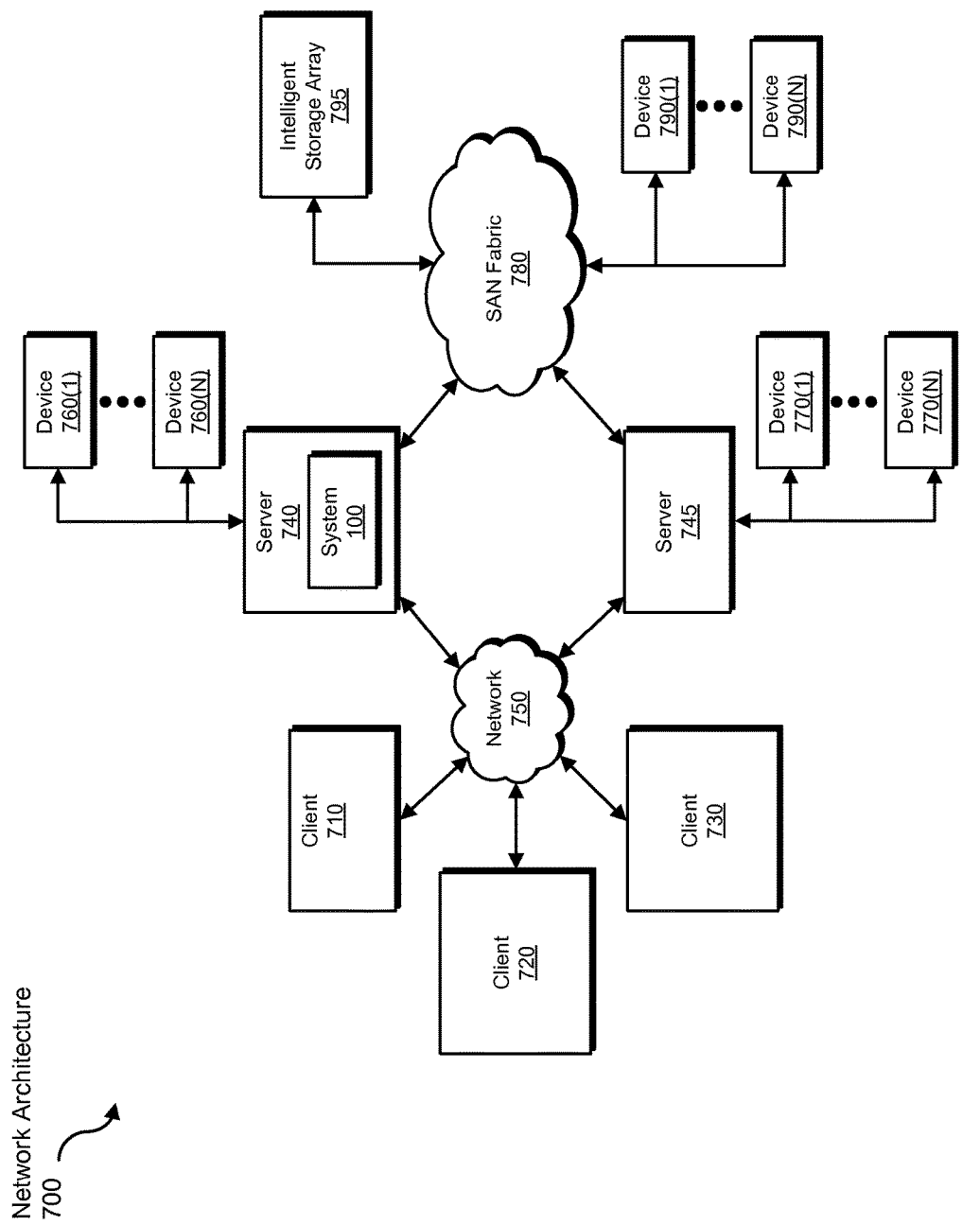
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for providing data backup services in a virtual environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive backup data to be transformed, transform the backup data by storing the backup data in a virtual environment, and output the backup data to a client from the virtual environment. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for providing data backup services in a virtual environment, at least a portion of the method being performed by a computing device comprising at least one processor, the method comprising:
   identifying a data path used to transfer, via a storage area network, backup data between a physical client system and a host operating system of a virtualized backup server;
   extending the data path to a guest operating system of the virtualized backup server by:
      determining that data transfer ports on the physical client system are unable to directly transfer the backup data to data transfer ports on the guest operating system; and
      in response to determining that the data transfer ports on the physical client system are unable to directly transfer the backup data to the data transfer ports on the guest operating system, establishing communication between the host operating system and a backup agent on the guest operating system by executing a daemon on the host operating system that:
         connects to the backup agent on the guest operating system; and
         enables a driver on the host operating system to manage data transfer ports on the host operating system by allocating the data transfer ports on the host operating system based on storage locations within the guest operating system; and
   after extending the data path to the guest operating system, utilizing the driver on the host operating system to facilitate data transfer between at least one of the data transfer ports on the host operating system and at least one of the data transfer ports on the guest operating system, resulting in the backup data being transferred between the physical client system and the backup agent of the guest operating system.

2. The method of claim 1, wherein identifying the data path used to transfer backup data between the physical client system and the host operating system comprises creating the data path.

3. The method of claim 1, wherein the driver executes outside of the host operating system.

4. The method of claim 1, wherein facilitating data transfer between the host operating system and the guest operating system comprises implementing a protocol based on at least one of:
   a cloud computing platform; and
   shared memory.

5. The method of claim 1, wherein the guest operating system stores the backup data on at least one virtual appliance configured as a special purpose virtual machine.

6. The method of claim 1, wherein:
   the data transfer ports on the physical client system comprise initiator ports;
   the data transfer ports on the host operating system comprise target ports; and the storage area network transfers, via fibre channels, the backup data between at least one initiator port on the physical client system and at least one target port on the host operating system.

7. The method of claim 6, wherein extending the data path comprises allocating the initiator port based on the storage locations within the guest operating system.

8. The method of claim 1, wherein identifying the data path used to transfer backup data between the physical client system and the host operating system comprises identifying an existing data path between the physical client system and the host operating system.

9. The method of claim 8, wherein the existing data path comprises data transfer ports on the host operating system that were allocated based on storage locations within the host operating system.

10. The method of claim 9, wherein the driver allocates the data transfer ports on the host operating system based on storage locations within the guest operating system by re-allocating the previously-allocated data transfer ports within the existing data path.

11. The method of claim 1, wherein the driver comprises a target mode driver.

12. A system for providing data backup services in a virtual environment, the system comprising:
   an identification module, stored in memory, that identifies a data path used to transfer, via a storage area network, backup data between a physical client system and a host operating system of a virtualized backup server;
   an establishing module, stored in memory, that:
      determines that data transfer ports on the physical client system are unable to directly transfer the backup data to data transfer ports on a guest operating system of the virtualized backup server; and
      in response to determining that the data transfer ports on the physical client system are unable to directly transfer the backup data to the data transfer ports on the guest operating system, establishes communication between the host operating system and a backup agent on the guest operating system by executing a daemon on the host operating system that:
         connects to the backup agent on the guest operating system; and
         enables a driver on the host operating system to manage data transfer ports on the host operating system by allocating the data transfer ports on the host operating system based on storage locations within the guest operating system;
   an extending module, stored in memory, that extends the data path to the guest operating system by utilizing the driver on the host operating system to facilitate data transfer between at least one of the data transfer ports on the host operating system and at least one of the data transfer ports on the guest operating system, resulting in the backup data being transferred between the physical client system and the backup agent of the guest operating system; and
   at least one hardware processor that executes the identification module, the establishing module, and the extending module.

13. The system of claim 12, wherein the identification module identifies the data path used to transfer backup data between the physical client system and the host operating system by creating the data path.

14. The system of claim 12, wherein the driver executes outside of the host operating system.

15. The system of claim 12, wherein the extending module facilitates data transfer between the host operating system and the guest operating system by implementing a protocol based on at least one of:
   a cloud computing platform; and
   shared memory.

16. The system of claim 12, wherein the guest operating system stores the backup data on at least one virtual appliance configured as a special purpose virtual machine.

17. The system of claim 12, wherein:
   the data transfer ports on the physical client system comprise initiator ports;
   the data transfer ports on the host operating system comprise target ports; and
   the storage area network transfers, via fibre channels, the backup data between at least one initiator port on the physical client system and at least one target port on the host operating system.

18. The system of claim 17, wherein the extending module extends the data path by allocating the initiator port based on the storage locations within the guest operating system.

19. A non-transitory computer-readable medium comprising one or more computer-executable instructions that, when executed by at least one processor of a computing device, cause the computing device to:
   identify a data path used to transfer, via a storage area network, backup data between a physical client system and a host operating system of a virtualized backup server;
   extend the data path to a guest operating system of the virtualized backup server by:
      determining that data transfer ports on the physical client system are unable to directly transfer the backup data to data transfer ports on the guest operating system; and
      in response to determining that the data transfer ports on the physical client system are unable to directly transfer the backup data to the data transfer ports on the guest operating system, establishing communication between the host operating system and a backup agent on the guest operating system by executing a daemon on the host operating system that:
         connects to the backup agent on the guest operating system; and
         enables a driver on the host operating system to manage data transfer ports on the host operating system by allocating the data transfer ports on the host operating system based on storage locations within the guest operating system; and
   after extending the data path to the guest operating system, utilizing the driver on the host operating system to facilitate data transfer between at least one of the data transfer ports on the host operating system and at least one of the data transfer ports on the guest operating system, resulting in the backup data being transferred between the physical client system and the backup agent of the guest operating system.

20. The computer-readable medium of claim 19, wherein the computer-executable instructions cause the computing device to identify the data path used to transfer backup data between the physical client system and the host operating system by creating the data path.

* * * * *